United States Patent [19]
Hammond et al.

[11] Patent Number: 5,208,846
[45] Date of Patent: May 4, 1993

[54] SUBSCRIBER LOOP TESTER FOR TELEPHONE SWITCHING SYSTEMS

[75] Inventors: John A. Hammond, Portland; James W. Edwards, Beaverton, both of Oreg.; Andre Lubarsky, Jr., Auburn, Calif.

[73] Assignee: Tektronix, Inc., Wilsonville, Oreg.

[21] Appl. No.: 758,971

[22] Filed: Sep. 3, 1991

[51] Int. Cl.$^5$ ............................................. H04M 3/30
[52] U.S. Cl. .................................... 379/15; 379/29; 379/28; 375/10
[58] Field of Search ..................... 379/27, 29, 28, 15, 379/16; 375/10

[56] References Cited
U.S. PATENT DOCUMENTS 4,185,174  1/1980  Beyhurst et al. ...................... 379/16

*Primary Examiner*—Stafford Schreyer
*Attorney, Agent, or Firm*—William K. Bucher

[57] ABSTRACT

A subscriber loop tester for testing local loops of telephone switching networks has a partitioned "U" interface and an internal bus architecture for converting various transceiver circuit output data formats to a common data format. The "U" interface has a high impedance transformer meeting bandwidth and line matching requirements for different line codes and protocols for ISDN telecommunication systems. The transformer is selectively coupled to option cards each containing circuitry having AC and DC terminations matching specific line codes and protocols for ISDN telecommunications systems and other types of telecommunications systems. The option cards further contain programmable attenuators for producing a proper nominal signal level as a function of the specific line code and protocol and providing variable insertion loss. A high speed bus is selectively coupled to the option cards for coupling the formatted transceiver circuit output data between the cards and a digital bus translator. The digital bus translator selectively configures the high speed bus for the transceiver output data format of the selected option card and converts the formatted output data received on the high speed bus to a common data format. Multiple source and destination audio paths in the subscriber loop tester are controlled by an audio switching matrix.

18 Claims, 10 Drawing Sheets

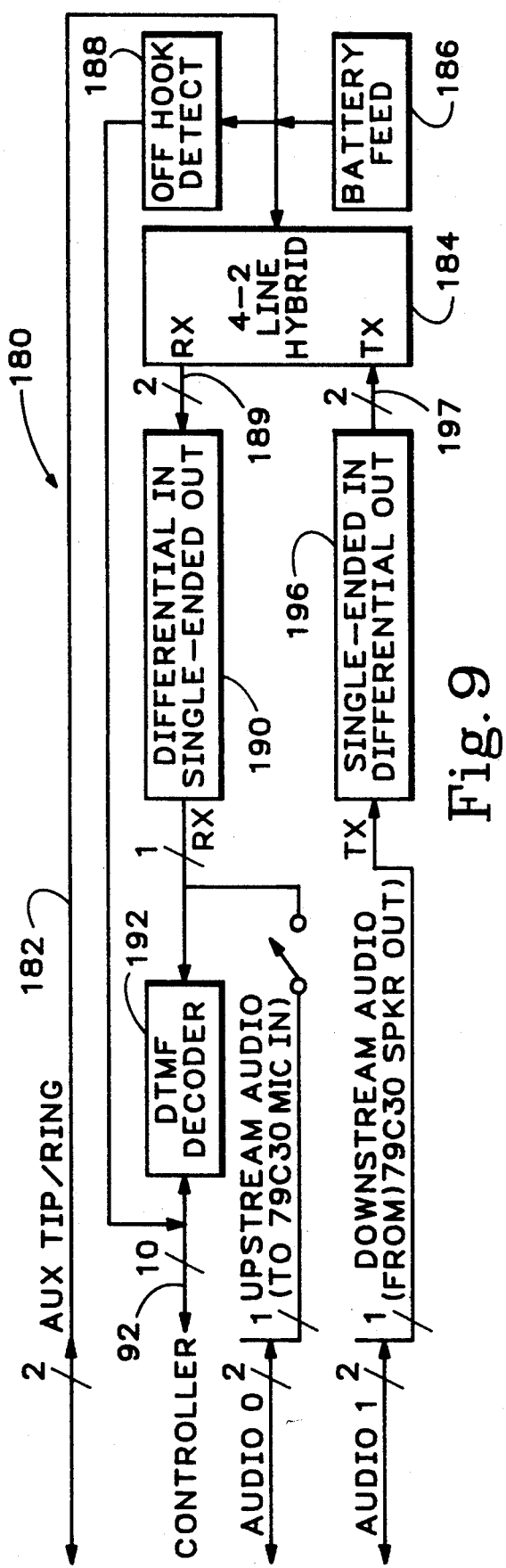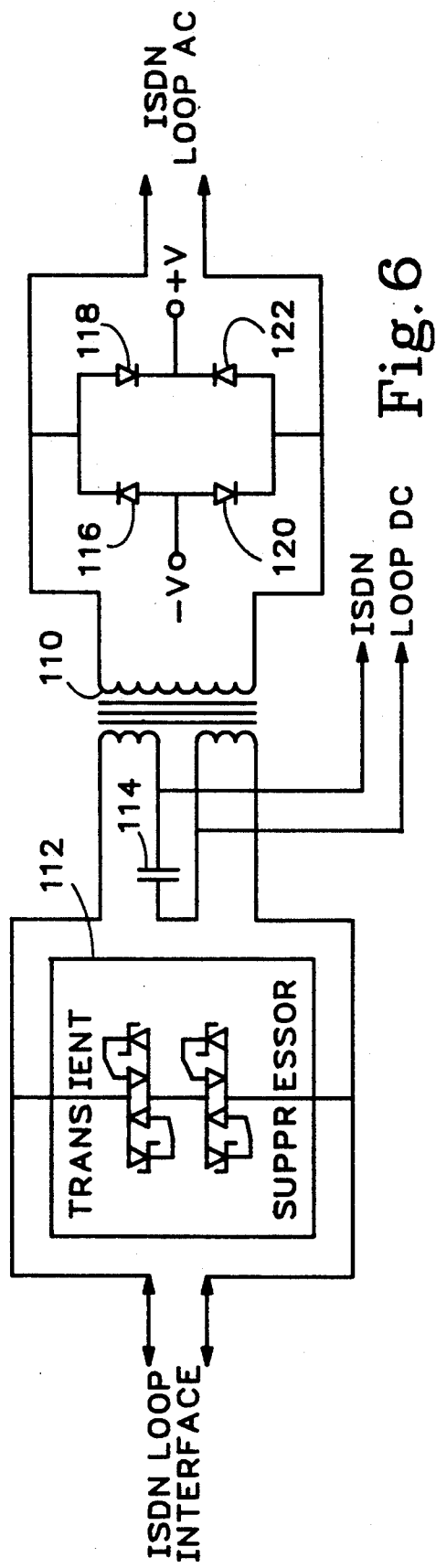
Fig. 9
Fig. 6

SUBSCRIBER LOOP TESTER FOR TELEPHONE SWITCHING SYSTEMS

BACKGROUND OF THE INVENTION

The present invention relates to test equipment for the telecommunications industry. More specifically the invention relates to a subscriber loop tester for testing, verifying, and maintaining telephone switching systems having various telecommunications standards implemented using various protocol and line code technologies.

The telecommunications industry is rapidly developing digital telecommunications technologies to replace analog telephone systems that have been in place for many years. Some digital telecommunications technologies are being implemented under standards established for Integrated Services Digital Networks (ISDN). To better understand the complex nature of these emerging telecommunications technologies, the International Standards Organization (ISO) developed a model for rationalizing the definitions of complicated telecommunications systems. The Open System Interconnect (OSI) model fractures a communications system into seven layers as is shown in FIG. 1. Of the seven layers shown, only the first three are of importance to the present invention. Layer 1 is called the Physical Layer and defines the physical interface for the system or network. The physical layer is responsible for sending and receiving information across the network. Layer 2 is called the Data Link Layer and is responsible for sending and receiving error-free data across the network. Tasks such as error detection and correction are performed by this layer. Layer 3 is called the Network Layer and is responsible for controlling the connections between various nodes on the network. The establishment of a connection from one node to another is controlled by this layer. The upper four layers deal with the types of services provided by the system and are implemented in software. Several different standards from the International Telegraph and Telephone Consultive Committee (CCITT) of the United Nations are specifically pertinent to the lower three layers of the OSI model.

Another important consideration for digital telecommunication is the breaking down of the various user access points within the network. The CCITT has defined various reference points for ISDN communications systems using letter designations. FIG. 2 is a simplified subscriber loop 300 in an ISDN telecommunications system showing these reference points. The loop 300 has a line termination (LT) 302, which may be at a central office switch, a repeater, or the like. A transmission line 304 connects the line termination 302 to the customer premise equipment (CPE) 306. This equipment includes the network termination (NT1) 308 and the terminal equipment (TE) 310. The reference point into the network termination NT1 308 is called the "U" reference point and the interface at this reference point is called the "U" interface. The reference point on the TE 310 side of the network terminator NT1 308 is called the "S/T" reference point and the interface at this reference point is called the "S/T" interface. The network termination NT1 308 is essentially a two wire to four wire converter having a two wire Data Circuit Terminating Equipment, DCE, loop jack at the "U" interface and a four wire Data Terminal Equipment, DTE, loop jack at the "S/T" interface. The four wire side of the network termination acts as a passive bus. Up to eight pieces of terminal equipment TE 310, such as telephones, may be connected to the "S/T" interface.

The CCITT has established standards for the "S/T" interface, which have been generally accepted. Unfortunately, this is not the case on the "U" interface side. This has led to multiple types of protocols for ISDN networks. For example, AT&T and Northern Telecomm have both developed individual proprietary AMI (Alternating Mark Inversion) protocols for ISDN networks. The American National Standards Institute (ANSI) developed its own "U" interface physical layer line code protocol, called 2B1Q (2 Binary, 1 Quaternary Modulation) and established it as the standard for the United States. Another "U" interface physical line code protocol, called 4B3T, has been developed in Europe.

Equipment manufacturers produce integrated circuit IC chip sets for implementing the various protocols. The chip sets include a "U" interface transceiver chip implementing a specific protocol and a "NT/ST" controller for implementing the standards as set down by the CCITT. Both the "U" interface to the transceiver chip and the "S/T" interface to the "NT/ST" controller require line interface circuitry for complying with the pertinent line interface standard, clock extraction circuitry. The interfaces also require transformer(s), protection circuitry, and connection to and termination of the line.

Each "U" interface physical line code protocol for the transceiver has its own characteristics. For example, the data rate for AT&T AMI at the "U" interface is 160 Kbits/sec. For 2B1Q, which is a four level code, the data rate is 80 Kbaud/sec with each baud being equivalent to two bits. In addition, each protocol has a unique power spectral density characteristics, AC and DC terminations, and line levels. The characteristic impedance of the AC termination for AMI is 120 ohms, for 2B1Q it's 135 ohms, and for 4B3T it's 150 ohms.

Between the "U" interface transceiver chip and the "NT/ST" controller chip, the data format and bus structure are defined by the chip manufacturer. This makes it difficult to produce a subscriber loop tester that can handle both the characteristics of the various "U" interface physical layer line code protocols and the data format and bus structure of various chip manufacturers. In addition, there are proprietary mixed analog/digital technologies, such as Meridiam Business Service developed by Norther Telecomm (called P-Phone), implemented in telecommunications systems, and analog POTS (Plain Old Telephone Service) telecommunications systems. Each type of system requires loop testing.

In loop testing, the customer premise equipment (CPE) is replaced by the subscriber loop tester. The subscriber loop tester contains circuitry that functions the same as the network termination (NT1), the terminal equipment (TE), or both in an ISDN system. In a POTS or P-Phone system, the subscriber loop tester functions as the phone. The subscriber loop tester transmits outgoing and receives incoming telecommunications signals from the local loop of the telephone switching network. An example of a subscriber loop tester for testing POTS and AT&T AMI telephone switching systems is the CT-100, manufactured and sold by Tektronix, Inc., Beaverton, Oregon, and shown in block diagram form in FIG. 1. For testing an AT&T AMI digital network, the subscriber loop tester 10 has a "U" interface jack 12 for connecting the two wire line from the telephone switching system. Signals coming from the digital telephone switch pass through a "U" interface attenuator 14 and are coupled to an AT&T AMI card 16 containing the AMI transceiver chip and the AC and DC termination circuits. The AMI line coded signals are converted to data format compatible with AT&T's proprietary K-BUS and couples the formatted data on the K-BUS 18 to a K-BUS controller 20. The K-BUS controller 20 passes 2B+D channel data to the "NT/ST" controller 22 over the K-BUS 18. The K-BUS controller 20 extracts maintenance channel information and makes it available to microprocessor 46 via a parallel interface over digital bus 48. Between the K-BUS controller 20 and the telephone switching network, equipment and maintenance information, such as framing information, synchronization status, when equipment is ready for traffic, and the like, is passed back and forth between the switch and the controller 20 via an embedded communications channel.

The "NT/ST" controller 22 translates the K-BUS formatted data to the "S/T" standard and couples the signals through a termination circuit 24 to a four wire NT jack 26. An external TE device, such as a digital phone, may be connected to the NT jack 26 when the subscriber loop tester 10 is being used to simulate the NT1. A four wire TE jack 28 is provided for connecting an external NT1 to the tester 10 when the tester 10 is simulating a digital phone. The tester 10 may also be configured to simulate both the NT1 and the digital phone. Switch 30 is closed providing a electrical path for the output of the digital phone circuits 32 via S attenuator 34 and termination 36. A speaker 38 and microphone 40 are provided for the digital phone circuits 32 as well as the analog POTS circuits 42. A separate loop jack 44 is provided for connecting a POTS telephone switching network to the tester 10. Configuring and control of various parts of the subscriber loop tester 10 is provided by the microprocessor 46 acting as a controller. The digital bus 48 connects the various parts of the tester 10 to the microprocessor 46.

In operation, a user configures the subscriber loop tester 10 for the particular test to be performed. For example, to test a NT1 device, the tester 10 is configured to simulate the NT1. The two wire loop from the telephone switch is connected to the "U" interface 12 and the digital phone is connected to the NT loop jack 26. Telecommunications signals pass back and forth between the digital phone and the telephone switch through the "U" interface attenuator 14, the AMI card 16, the K-BUS 18, the K-BUS controller 20, "NT/ST" controller 22 and termination 24. The tester 10 may also be configured to replace the NT1 and the digital phone. Switch 30 is closed connecting the digital phone circuits 32 into the communications path of the tester 10. Analog voice data generated by the microphone 40 is converted to digital form in the digital phone circuits 32 and coupled to the "NT/ST" controller 22 via the "S" attenuator 34, termination 36 and switch 30. The "NT/ST" controller translates the digital voice data into a data format compatible with the K-BUS 18. The formatted data is coupled through the K-BUS controller 20 to the AMI card 16. The AMI transceiver converts the formatted data to AMI line coded signals. From the AMI card 16 the signals carrying the voice data and the embedded maintenance channel information from the K-BUS controller are coupled through the "U" interface attenuator 14 and "U" interface loop jack to the digital telephone switching network. Incoming telecommunications information travels the same path as the outgoing information but is routed to the speaker 38.

The tester 10 may be further configured for testing analog POTS telephone switching networks. The analog telephone switching network is connected to the loop jack 44. Analog signals to and from the switch pass through the POTS circuitry 42. Speaker 38 and microphone 40 respectively receive and send analog voice information to the POTS circuitry 42.

Subscriber loop testers, such as the CT-100 have been developed to meet the need for testing one type of "U" interface physical layer line code protocol for an ISDN communications system and for testing analog POTS systems. What is needed is a single subscriber loop tester that has the capability of testing many types of "U" interface physical layer line code protocols in ISDN communication systems as well as testing analog POTS systems, and hybrid analog-digital systems like P-Phone using a single loop input jack. In addition, the subscriber loop tester should be capable of testing phone systems implementing new protocol and proprietary standards that are currently under development.

SUMMARY OF THE INVENTION

Accordingly, the present invention is a subscriber loop tester for transmitting outgoing telecommunications signals to and receiving incoming telecommunications signals from a telephone switching system having different line code and protocols and telecommunications standards. The subscriber loop tester has a partitioned "U" interface having a high impedance transformer for meeting bandwidth and line matching requirements for the different "U" interface line codes and protocols implemented in an ISDN telecommunications system. A plurality of circuits are selectively coupled to receive the telecommunications signals from the high impedance transformer with each circuit having AC and DC terminations matching a specific line code and protocol. Each circuit further has programmable attenuators for producing a proper signal level as a function of the specific line code and protocol and providing variable insertion loss. The terminations and the attenuators are coupled to a transceiver circuit for generating an output having a specific data format. A high speed bus selectively couples the formatted data output of the transceiver circuits between the plurality of circuits and a digital bus translator. The digital bus translator selectively configures the high speed bus for the specific transceiver formatted data output of the selected circuit of the plurality of circuits and converts the formatted output data to a common formatted data output. Means are provided for controlling the source and destination audio paths for voice data in the subscriber loop tester.

In a further aspect of the present invention, the partitioned "U" interface has a high impedance transformer separated from and selectively connected to multiple circuits implementing specific line codes and protocols of ISDN telecommunications systems. The high impedance transformer meets the bandwidth and line matching requirements for the different line codes and protocols. Each circuit has AC and DC terminations matching a specific line code and protocol and programmable attenuators for producing a proper nominal signal level as a function of the specific line code and protocol and providing variable insertion loss.

In another aspect of the present invention, the subscriber loop tester has an internal bus architecture for converting formatted output data from different transceiver circuits to a common format data output. A plurality of circuits with each circuit having AC and DC terminations matching a specific line code and protocol of a ISDN telecommunications system are selectively coupled to a high speed bus for coupling the transceiver formatted output data between the plurality of circuits and a digital bus translator. Each circuit further has programmable attenuators for producing a nominal signal level as a function of a specific line code and protocol and providing variable insertion loss. The digital bus translator selectively configures the high speed bus for the specific transceiver formatted output data of the selected circuit and converts the formatted output data to a common data format.

The objects, advantages and novel features of the present invention are apparent from the following detailed description when read in conjunction with appended claims and attached drawings.

BRIEF DESCRIPTION OF THE DRAWINGS

FIG. 6 is a schematic diagram of the common "U" interface for the subscriber loop tester according to the present invention.

FIG. 9 is a block diagram of the analog terminal adapter card for the subscriber loop tester according to the present invention.

DETAILED DESCRIPTION OF THE PREFERRED EMBODIMENT

Figure 4:
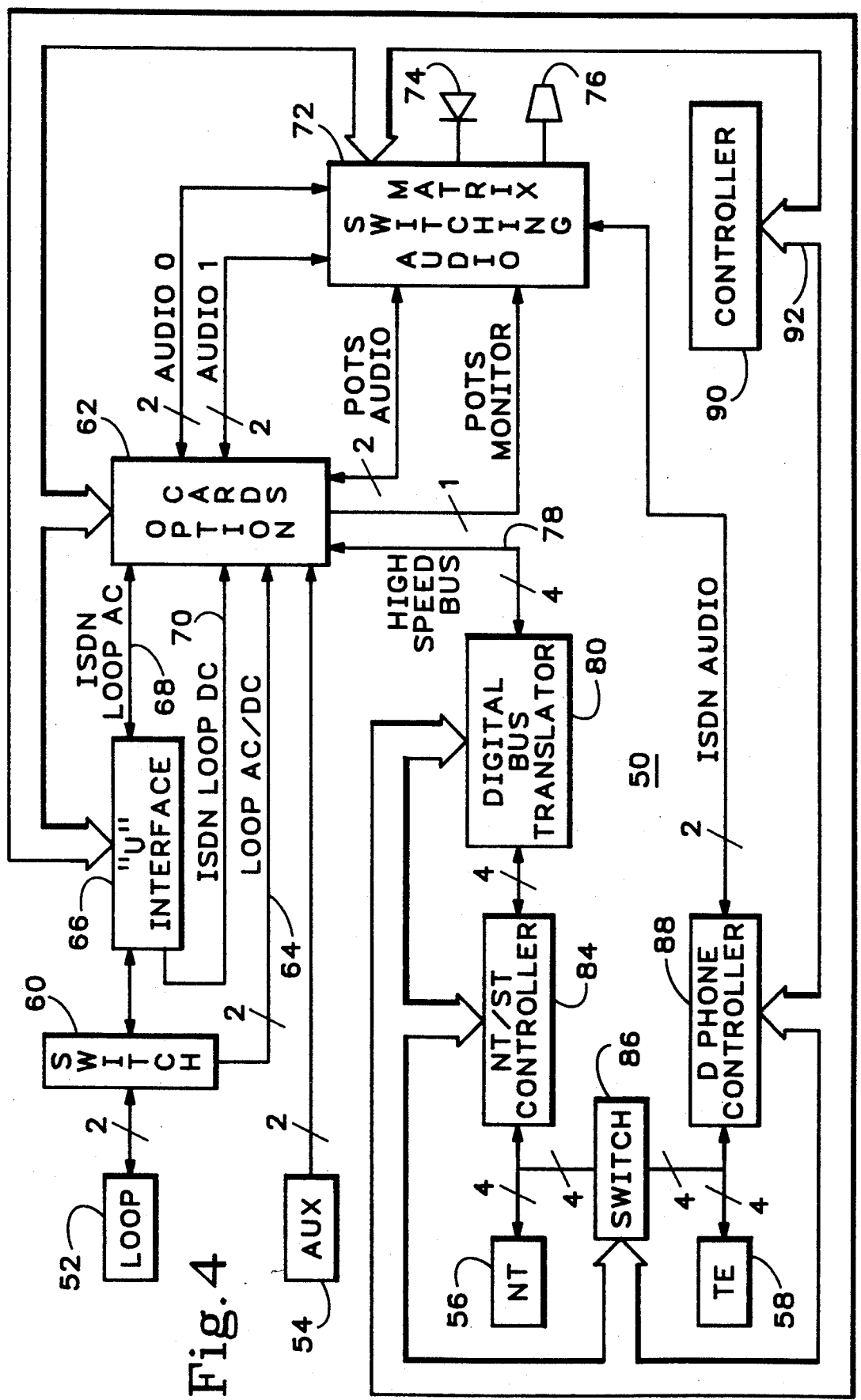
FIG. 4 is a block diagram of the subscriber loop tester according to the present invention.
Figure 5A:
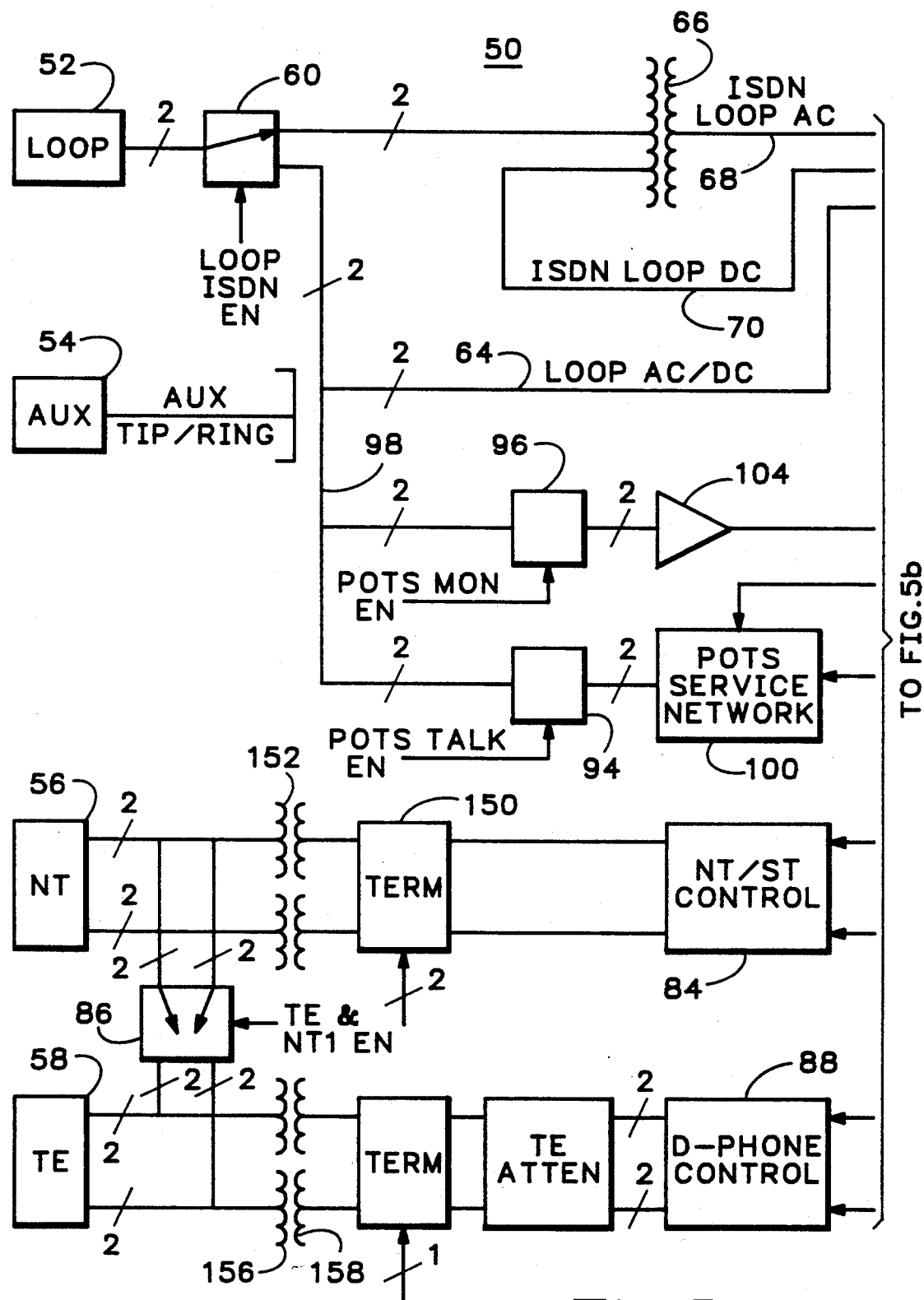
FIG. 5 is a detailed block diagram of the subscriber loop tester according to the present invention.
Figure 5B:
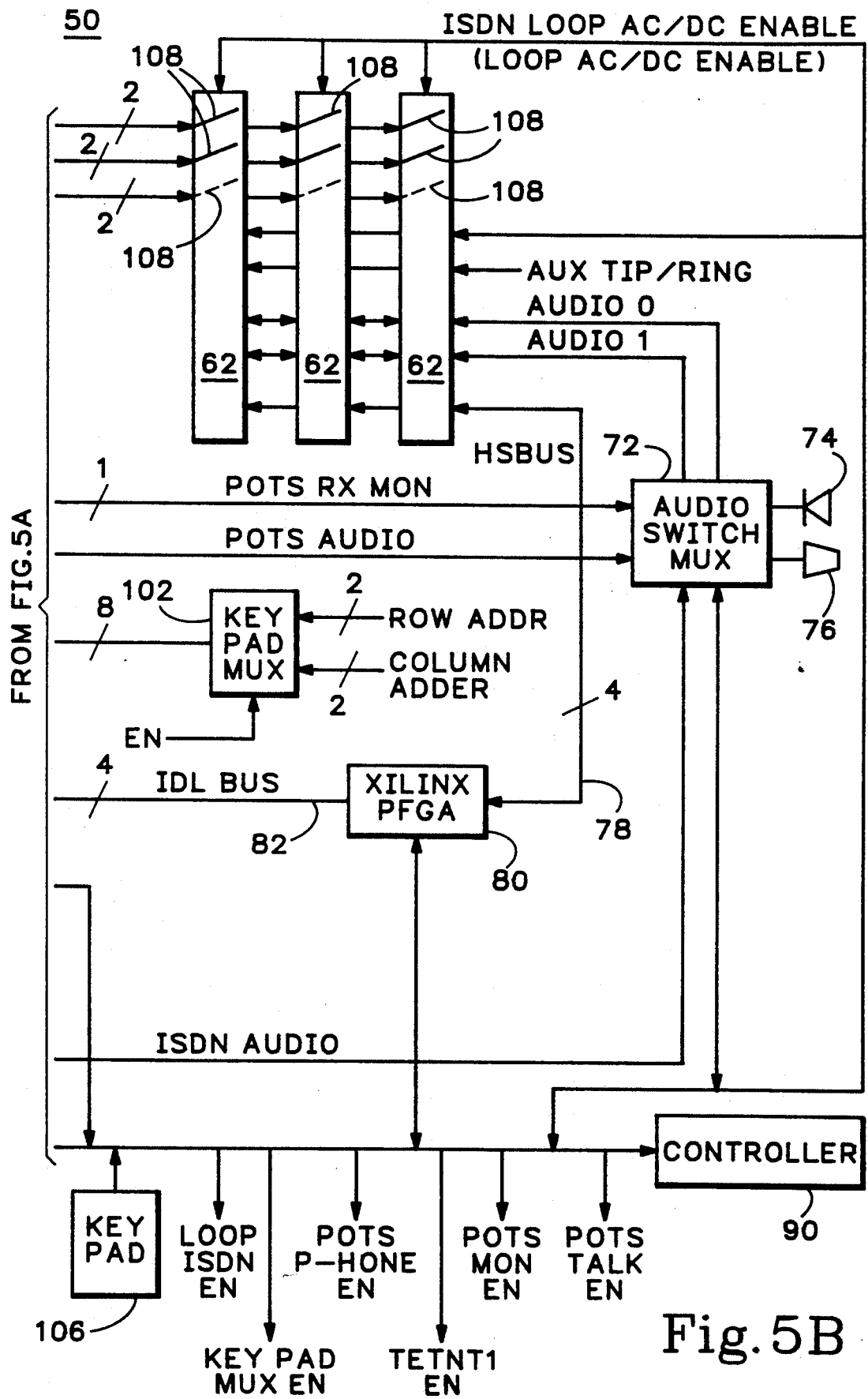

The block diagram of FIG. 4 shows the preferred embodiment of the subscriber loop tester 50 according to the present invention. The subscriber loop tester 50 is a programmable test instrument for performing a variety of tests on subscriber loops in a telecommunications system. Depending on the communications standard, such as POTS, P-Phone or ISDN implemented using various "U" interface line codes and protocols, the telecommunications information incoming to and outgoing from the subscriber loop tester 50 may include analog or digital voice information, digital data information, signaling information, and embedded operations channel data. Therein after all such data and information will be referred to as signals. In addition, the invention will be described with reference to signals going in one direction but it is understood that the signals passes back and forth between the subscriber loop tester 50 and the telephone switching network.

In the preferred embodiment, the subscriber loop tester 50 is a menu driven device. An operator selects from the menu a communications standard matching the telephone network and a particular test to be performed. A microprocessor 90 under program control configures the tester 50 for the test. It is understood and well known in the microprocessor controlled test instrument art that the microprocessor 90 has associated ROM, RAM, I/O ports, firmware, and the like, for controlling the operation of the instrument.

The internal architecture of the subscriber loop tester 50 of the present invention provides a high degree of flexibility for testing many different types of telephone communications standards. This flexibility is accomplished by partitioning the critical functions of the tester 50 on option cards 62. This allows the optimization of the option card 62 functions to give a high degree of precision attenuation control, impedance matching, and termination. Key elements in the partitioned architecture are: placing the attenuation and impedance matching circuits for the various line codes and protocols in ISDN on the option cards 62, a partitioned "U" interface for ISDN data and a separate input non-ISDN based telecommunications standards, a digital bus translator 80 being able to configure high speed I/O lines 78 between the option cards 62 and the translator 80 for different transceiver chip sets, and an audio switching matrix 72 providing multiple paths for source and destination audio.

The subscriber loop tester 50 has four RJ45 input jacks: a loop jack 52, an auxiliary jack 54, a NT interface jack 56, and a TE interface jack 58. This configuration differs from previous subscriber loop testers in that the loop input jack 52 provides the input connection for all types of local loop communications standards. In previous loop testers, such as the CT-100, a separate "U" input was needed for the AT&T AMI line code and protocol for ISDN from the analog POTS input. Telecommunications signals incoming from a telephone switching system or repeater (not shown) and telecommunications signals outgoing from the subscriber loop tester 50 are coupled to the loop input jack 52.

Switch 60 is connected to the loop input jack 52 for coupling the telecommunications signals to the proper signal path. A two wire LOOP AC/DC line 64 couples POTS, P-Phone, or other analog based standard signals to the option cards 62. Digital ISDN signals are coupled to a partitioned "U" interface 66. The ISDN LOOP AC component of the ISDN digital signal is coupled through the partitioned "U" interface 66 to the option cards 62 via lines 68. The ISDN LOOP DC component of the ISDN digital signals is coupled around the partitioned "U" interface 66 to the option cards 62 via lines 70. Each option card 62 contains line code and protocol specific circuitry, such as AC and DC terminations, programmable attenuators, and transceiver circuits, for the various telecommunications standards, such as AT&T AMI, 2B1Q, and 4B3T for ISDN, POTS, and P-Phone. Other application specific circuits, such as tip/ring circuits may be included on an option card 62. In the preferred embodiment, the option cards 62 are removable circuit boards that are electrically connected to each other in the tester 50 by a common electrical bus. Analog voice signals associated with the POTS and P-Phone standards are coupled to an audio switch matrix 72 from the option cards 62. Audio transducers in the form of a speaker 74 and a microphone 76 are also connected to the matrix 72 as well as ISDN AUDIO from a D-Phone (digital phone) controller 88. The audio switching matrix, to be discussed in greater detail below, provides complete routing flexibility for both audio sources and destinations.

Each line code and protocol specific transceiver on the option cards 62 generate an output having a specific data format. The data format is defined for a particular bus architecture by the manufacturer of the transceiver circuit. Generally, the transceiver circuit is part of a chip set for use in coupling telecommunication signals from one interface to another, such as from the "U" interface to the "S/T" interface. Communications between the chips in the chip set are over a bus specifically designed for the chips. For example, AT&T formats the output data of the transceiver chips in its chip set for its K-BUS, Motorola, Inc. formats the data in its chip set for its IDL BUS, and Siemens formats the data in its chips set for its IOM BUS.

A HIGH SPEED BUS 78 couples the formatted output data for the ISDN and P-Phone transceivers from the option cards 62 to a digital bus translator 80. The HIGH SPEED BUS 78 is a four line bus carrying transmit and receive data, a clock signal and framing information. These signals pass back and forth on the BUS 78 between the option cards 62 and the digital bus translator 80. The digital bus translator 80 configures the HIGH SPEED BUS 78 for the formatted output data of the particular transceiver circuit selected. The translator 80 converts the formatted output data of the transceiver circuit from the HIGH SPEED BUS 78 to a common output data format. In the preferred embodiment, the common output data format is implemented using Motorola's IDL format for transfer on an IDL BUS 82. Formatted data entering the translator 80 on the IDL BUS 82 is converted to the output data format of the transceiver circuit connected to the HIGH SPEED BUS 78. P-Phone digital data, which is not an ISDN technology, is not converted to the IDL BUS format. The converted formatted output data is coupled over the Interchip Digital Link (IDL) BUS 82 to a NT/ST controller 84. The NT/ST, which in the preferred embodiment is a Motorola, Inc. part, converts the common output data to the "S/T" protocol standard and couples the output to the NT interface jack 56. A switch 86 may connect the NT interface jack 56 to the TE interface jack 58. The TE interface jack 58 is connected to the D-Phone (digital phone) controller 88. The D-Phone controller 88 is coupled to the analog switching matrix 72 for coupling ISDN AUDIO between the two devices. A controller 90, such as a microprocessor, is connected to various parts of the subscriber loop tester 50 via a bus 92. The controller 90 under program control passes data and control signals to the various parts of the tester 50.

Figure 1:
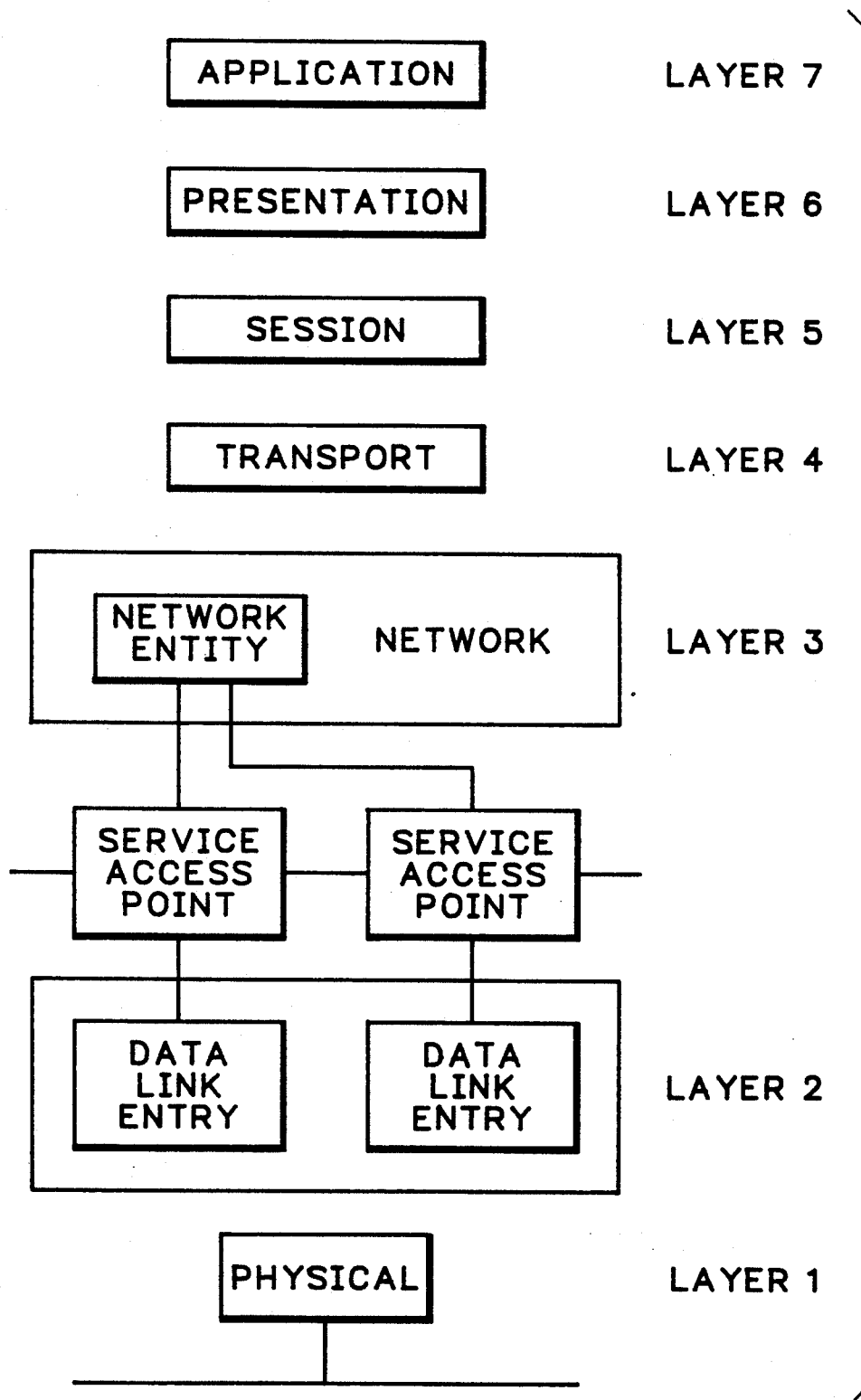
FIG. 1 is representative diagram of the seven layers of a telecommunications system.
Figure 2:
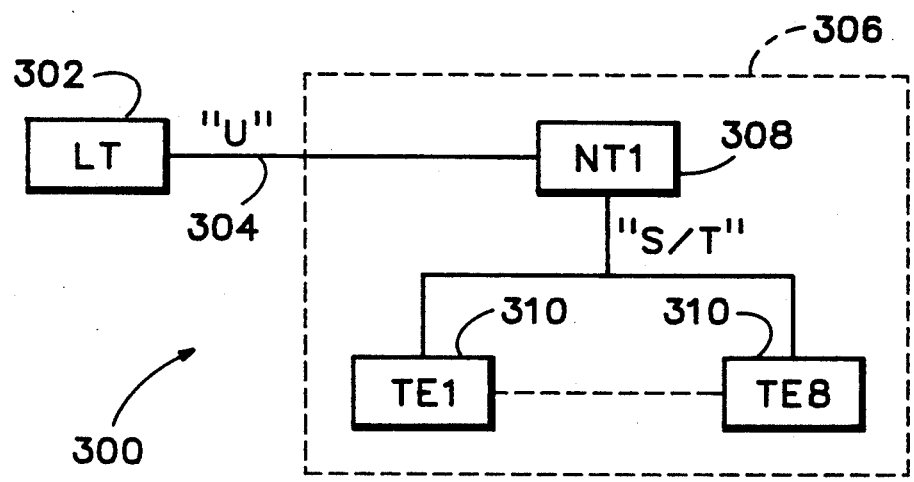
FIG. 2 is simplified diagram of a subscriber's loop in a ISDN telecommunications system.
Figure 3:
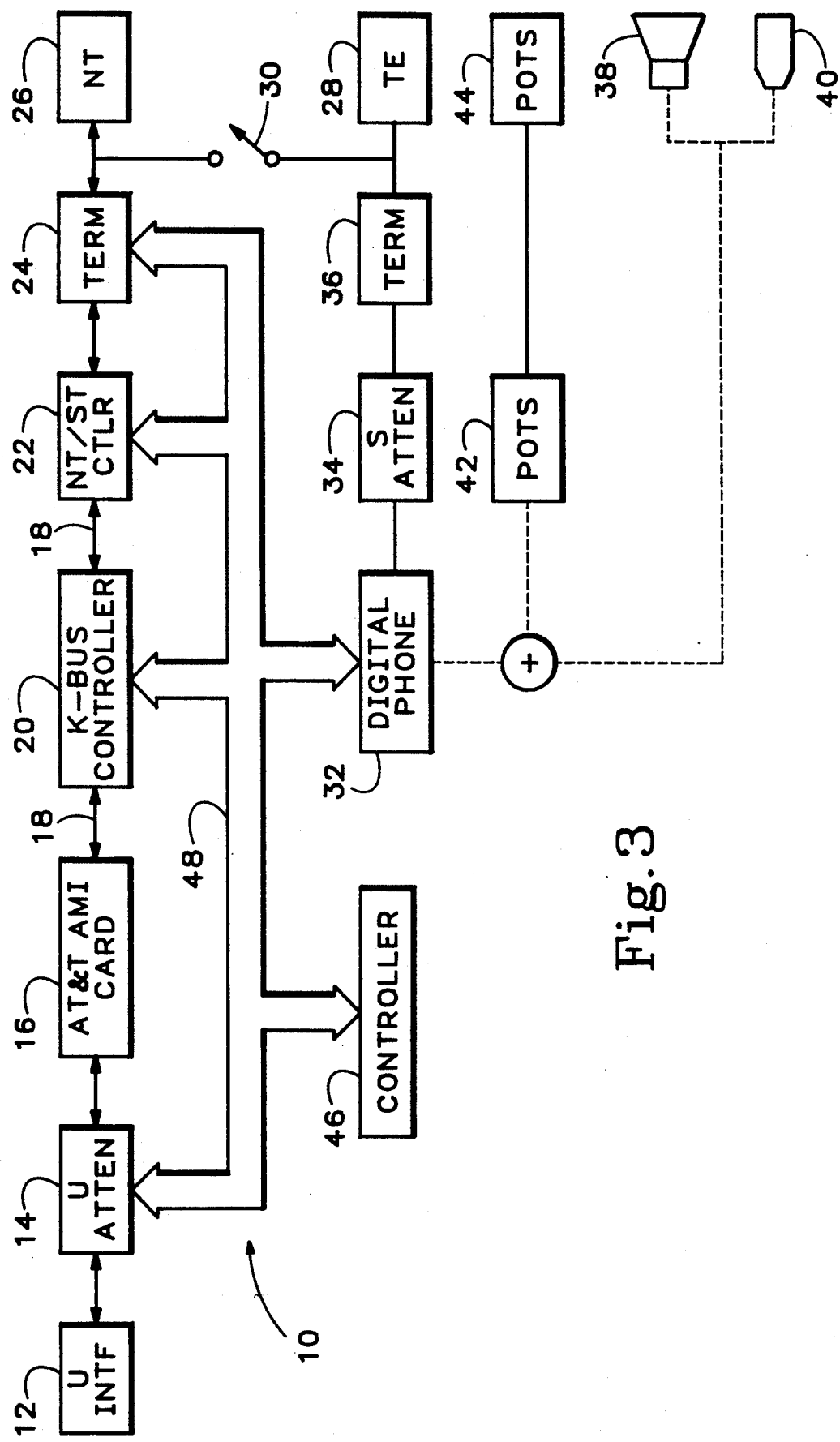
FIG. 3 is a block diagram of a prior art subscriber loop tester.

The subscriber loop tester 50 will be discussed in greater detail in relation to the detailed block diagram of FIG. 3 and the block diagrams and schematics of FIG. 4 through 8. Common elements in the various figures are shown with the same numerals. Loop jack 52 provides the interface between the subscriber loop tester 50 and the local loop of the telephone switching network. Switch 60 provides separate signal paths for ISDN and non-ISDN signals. A LOOP ISDN EN signal from the controller 90 activates switch 60 for controlling the path direction of the data. The ISDN signals are coupled to the common "U" interface 66 and the non-ISDN signals are coupled to the LOOP AC/DC line 64 or to the POTS talk and monitor switches 94 and 96. This configuration is a further embodiment of the present invention. As previously described, the POTS circuitry may be placed on an option card 62 and coupled to receive data over the LOOP AC/DC lines. Since the analog POTS standard is still the most widely installed base, the POTS circuitry may be configured as part of the base tester and not as an option. This allows an extra option card 62 to be installed in the tester 50.

The option cards 62 are effectively parallel coupled to the ISDN LOOP AC and LOOP DC lines 68 and 70 and the LOOP AC/DC line 64 through programmable switches 108. During the tester 50 set-up, a particular telecommunications standard is selected and the controller 90 sets the switches 108 so only one option card is coupled to the signal input lines 64, 68 and 70.

Switches 94 and 96 are respectively activated in response to POTS TALK EN and POTS MON EN from controller 90. The POTS signal passes through switch 94 and is coupled to the POTS service network 100, which provides the proper termination and impedance for the POTS telephone loop. The output of the POTS service network 100 is the POTS AUDIO, which is coupled to the audio switch matrix 72. A keypad mux 102 is coupled to the POTS service network 100 and is activated by KEY PAD MUX EN from the controller 90. The keypad mux 102 receives row and column information from the controller 90 in response to buttons being pressed on a keypad 106. The POTS service network 100 scans the keypad mux 102 and reads the row and column information enabling keypad information to be entered into the POTS service network 100. A POTS MON EN signal from the controller 90 enables switch 96 for passing the POTS RX MON signal to the audio switch matrix 72 via buffer 104. This allows monitoring of the analog signal in a high impedance bridging mode.

Each "U" interface line code and protocol implementing the ISDN standard has a unique power spectral density characteristic, AC and DC terminations, and line levels. In addition, each protocol has a different nominal signal level into its defined AC impedance. Attenuators are needed to allow matching of the nominal signal levels and the ability to insert defined amounts of loss for a approximate check of the line quality and length. The "U" interface on previous subscriber loop testers were designed to meet the characteristics of a particular line code and protocol implementing the ISDN standard. The termination circuits, attenuators and an input digital line transformer were optimized for the particular protocol. However, optimizing the input circuits for one protocol compromises the characteristics for another protocol. This is overcome in the instant invention by partitioning the "U" interface 66. The input digital line transformer 110 is used as a common transformer input and is mounted separate from the termination circuits and attenuators. The termination circuits and attenuators for each specific "U" interface line code and protocol implementing ISDN are placed on the option cards 62 and interface with a common digital line transformer. This is shown in greater detail in the block diagrams of FIGS. 6 and 7.

The ISDN signals are coupled through switch 60 to the partitioned "U" interface 66. The partitioned "U" interface 66 has a common digital line transformer 110 for meeting the bandwidth and line matching requirements of the various line codes and protocols implementing the ISDN standard. The transformer 110 provides a high impedance with respect to any "U" interface AC termination circuit connected in parallel to the secondary of the transformer over the ISDN LOOP AC. A digital line transformer meeting the above requirements is manufactured and sold by Dale Electronics, Columbus, Nebr., under Part Number PT-200-06. A low capacitance transient suppressor 112 is coupled in parallel with the primary winding of the transformer 110 as a primary protection device. The transient suppressor 112 is a low capacitance device with a breakdown voltage of 200 volts. Devices of this type are manufactured and sold by Texas Instrument, Inc., Dallas, Tex., under the name Transorb, Part Number TISP3180. A DC blocking capacitor 114 is serially connected to a center tap in the primary winding of the transformer 110 for blocking the DC component of the ISDN data from the transformer 110. The ISDN LOOP DC signal is taken off the capacitor 114 and coupled to the option cards 62. Voltage clamping diodes 116-122 are coupled in parallel with the secondary winding transformer 110 as secondary protection devices. The ISDN LOOP AC from the secondary of transformer 110 is coupled to the option cards 62.

The ISDN LOOP AC signal is input to a 2-4 line hybrid converter 130 that separates the signal into its receive and transmit components for separately inserting attenuation into each component. The Hybrid converter also provides AC termination, filtering, and maximizes transhybrid loss. The ISDN LOOP DC is input to a DC termination circuit 132 that provides sealing current, maintenance triggers, and device presence. The hybrid 130 output is coupled to receiver and transmitter attenuators respectively numbered 136 and 138. Attenuators 136 and 138 are programmable devices receiving control signals via controller 90. Alternately, control signals for the attenuators 136 and 138 may come from a serial logic controller (not shown), which receives control signals from controller 90. Attenuators 136 and 138 provide accurate attenuation values for accurate operational threshold measurements. Attenuators 136 and 138 are connected to a transceiver circuit 140. In the figure, both the AT&T AMI and the 2B1Q transceiver are shown. In actual practice only one transceiver circuit is placed on an option card 62. Generally, the transceiver circuit 140 is in the form of an integrated circuit IC chip. The AT&T AMI transceiver circuit 140 is part of an IC chip set manufactured by AT&T under Part Numbers T7260 and T7261. In the preferred embodiment, the 2B1Q transceiver chip is manufactured by Motorola, Inc., Schaumberg, Ill., under Part Number MC145472. As has been previously described, the transceiver circuit 140 is part of a dual chip set that also includes a transceiver in the "NT/ST" controller. Between these two transceivers, communications is over a manufacturer's designed bus.

The output of transceiver 140 is formatted for the particular manufacturer's bus and is coupled to the HIGH SPEED BUS 78. The HIGH SPEED BUS 78 is configured by the digital bus translator 80 for capability with the transceiver chip 140. For the AT&T AMI option card the HIGH SPEED BUS 78 is configured as the K-BUS. For the 2B1Q option card the HIGH SPEED BUS 78 is configured as the IDL BUS. Control signals from the controller are received by the transceiver circuit 140 via control lines 142. Those having ordinary skill in the telecommunications art will recognize that an SCP logic controller and SCP bus are required for controlling Motorola parts, such as the transceiver 140 on the 2B1Q option card. The SCP logic controller (not shown) receives control commands from the controller 90. The K-BUS transceiver 140 in the AT&T AMI option card may receive control signal directly from the controller 90 or from a serial logic controller (not shown) connected to the controller 90.

The output of the receiver attenuator 136 is also coupled to a buffer 144. The output of the buffer 144 is coupled to an analog-to-digital converter A/D (not shown). The A/D converter and associated circuitry provides a monitoring function within the subscriber loop tester 50 for checking the operating status of circuits within the option cards 62 and the voltage signal levels received over the ISDN LOOP AC line.

Figure 8:
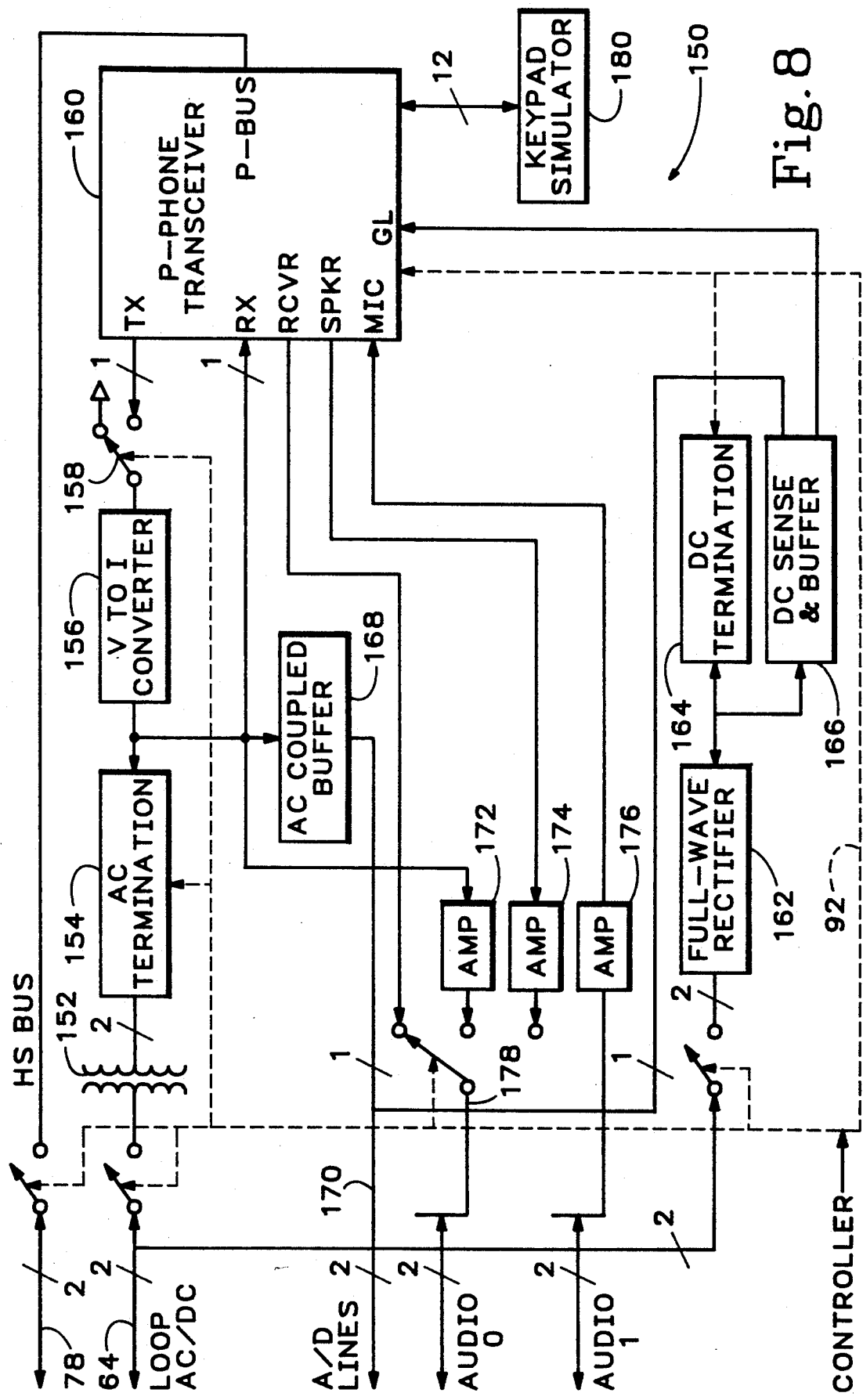
FIG. 8 is a block diagram of the option card for the P-Phone line code and protocol standard for the subscriber loop tester according to the present invention.
Figure 10:
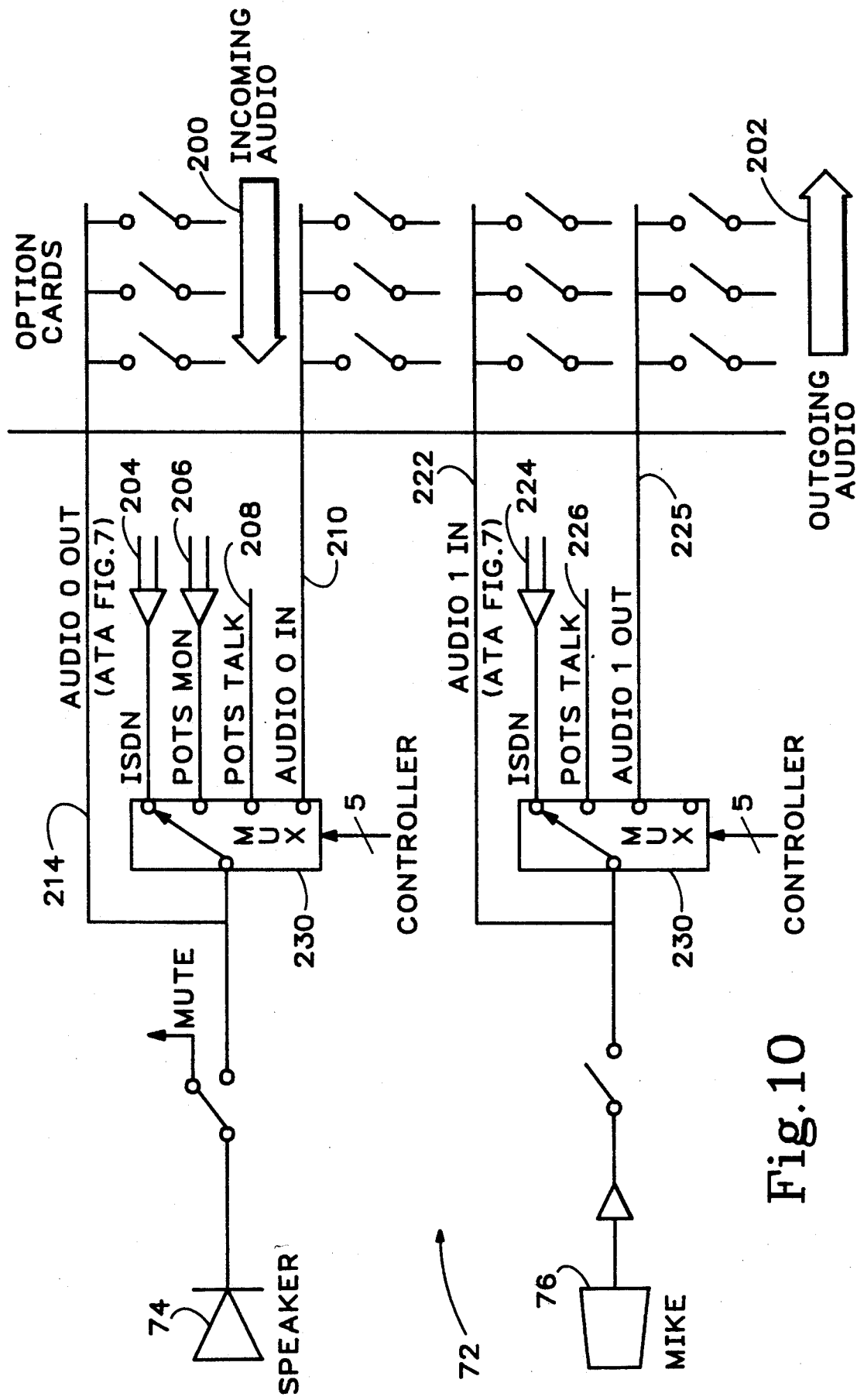
FIG. 10 is a block diagram of the audio switching matrix in the subscriber loop tester according to the present invention.

Referring to FIG. 8, there is shown a block diagram of the P-Phone option card 150. The analog/digital data enters the P-Phone card 150 on LOOP AC/DC line 64 and is transformer 152 coupled to an AC termination circuit 154. The output of the AC termination circuit 154 is coupled to the receive RX port of the P-Phone transceiver circuit 160, amplifier 172, and an AC coupled buffer 168. The output of the AC coupled buffer is output on the A/D line 170. Amplifier 172 is connected to one terminal of switch 178. A second terminal of switch 178 is connected to the RCVR port of the transceiver circuit 160. A third terminal of switch 178 is connected to amplifier 174, which is connected to the speaker SPKR port of the transceiver circuit 160. The common terminal of switch 178 is connected to the AUDIO 0 lines, which are connected to the audio switch matrix 72.

The AC termination is also connected to a voltage to current converter 156, which receives its input from the transmit TX output of the transceiver circuit 160 via switch 158. The P-Phone transceiver circuit 160 is implemented as an integrated circuit chip and is a proprietary technology of Northern Telecommunications, Inc. Controller 90 provides control signals to the transceiver circuit 160 over the controller bus 92 for controlling the keypad simulator 180, terminations 154 and 164, and the like. These elements may also be controlled by serial bus controller (not shown) controlled by the controller 90. The controller 90 also provides control signals over the HIGH SPEED BUS 78 connected to the P-BUS port via the digital bus translator 80. The digital P-Phone data is stored in the transceiver circuit 160 until the data is polled by the digital bus translator 80. The digital bus translator 90 continually interrogates the transceiver circuit 160 to get the stored data, which is read by the controller 90 over the parallel bus interface 92.

The analog/digital data is also coupled to a full-wave rectifier 162 The output of the full-wave rectifier 162 is coupled to a DC termination circuit 164 and a DC sense and buffer 166. The output of the DC sense and buffer circuit 166 is coupled to the GL input of the transceiver circuit 160 and to A/D lines 170. The DC level from the DC sense and buffer circuit 166 to the GL input of transceiver 160 is a direct indication of the loop length, which allows the transceiver 160 to compensate the audio for automatic gain control of the volume. The microphone MIC input of the transceiver circuit 160 is coupled to amplifier 176, which receives its input on the AUDIO 1 lines from the audio switch matrix 72. The various switches on the P-Phone option card respond to control signal from the controller 90.

The analog/digital signal on the LOOP AC/DC line is coupled to the RX input of the transceiver circuit 160. The analog portion of the signal is routed out of the circuit 160 on the RCVR port to switch 178. The digital portion is stored in the transceiver circuit 160 until accessed by the digital bus translator 80 over the high speed bus 78. The analog/digital signal is routed through amplifier 172 directly to one of the terminals of switch 178. Alerting signals are routed through the transceiver circuit and output at the SPKR port to amplifier 174, which connected to switch 178. Depending on the position of switch 178, the analog data from the RCVR port is coupled through the audio switching matrix to the speaker 74. The audio coming out of amplifiers 172 and 174 may also be coupled to the audio switching matrix 72. The coupling of amplifier 172 to the audio switching matrix provides an ability to listen to the line in a high impedance bridged mode like the monitor mode function in discussed for POTS.

Figure 7:
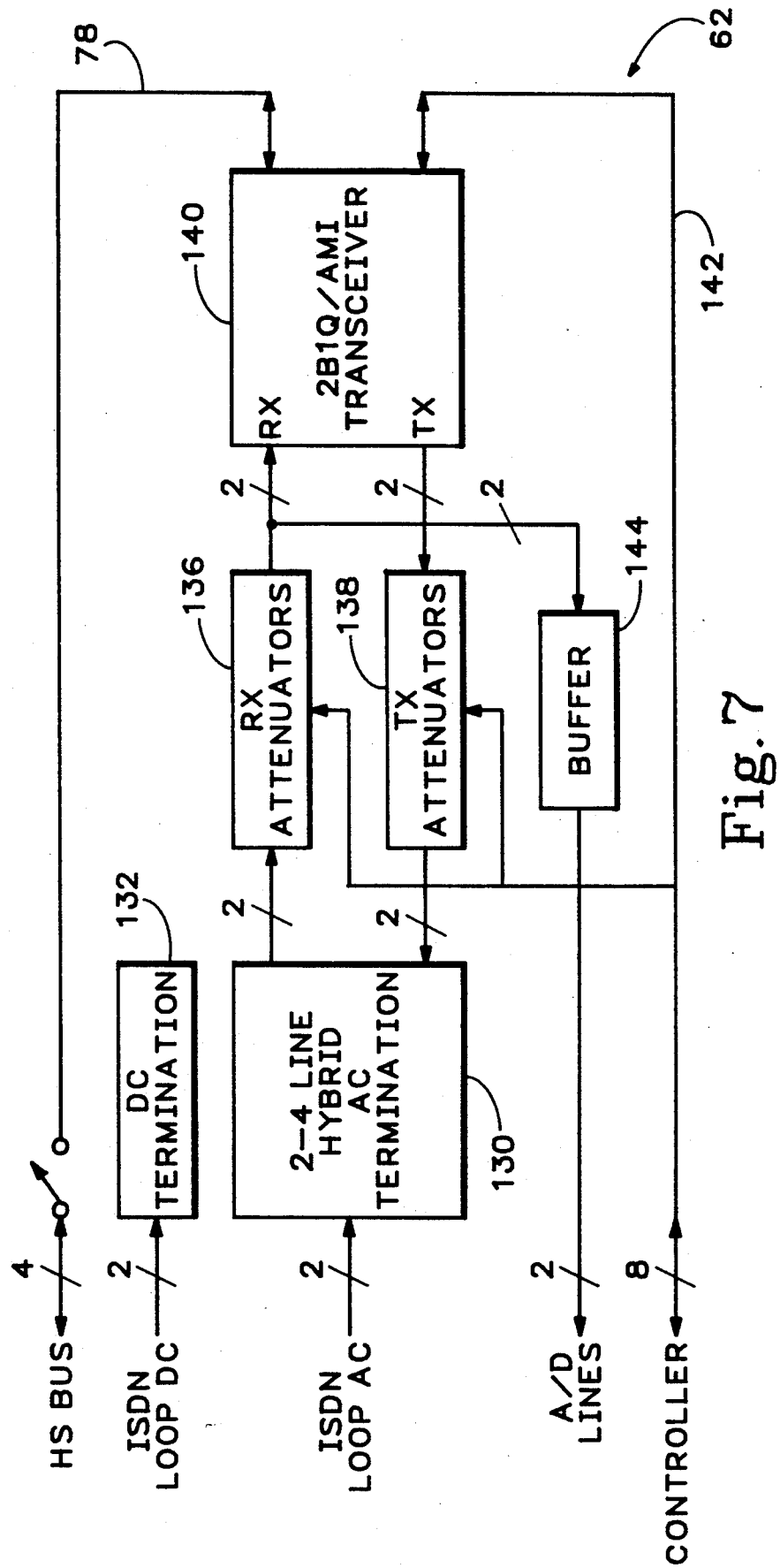
FIG. 7 is a block diagram of the option cards for ISDN data communications standards for the subscriber loop tester according to the present invention.

The block diagram of FIG. 7 shows an Analog Terminal Adapter Card 180. The Analog Terminal Adapter Card 180 receives an analog input on the AUX TIP/RING lines 182 that are connected to the auxiliary input jack 54. The analog input is coupled to a 2-4 line hybrid 184. The AUX TIP/RING line is also connected to a battery feed 186 and an off hook detector 188. The battery feed 186 provides the loop current to the analog AUX TIP/RING circuit. The off hook detector 188 activates when a device connected to the auxiliary input jack 54 is taken off hook. The off hook information is passed to the controller 90.

The 4-2 line hybrid provides AC termination for the AUX TIP/RING line 182. The four line side of the hybrid circuit 184 has a two line receive RX output and a two line transmit TX input. The RX lines 189 are coupled through a differential IN, single-ended OUT amplifier 190 to a dual-tone multi-frequency decoder (DTMF) 192 and to the AUDIO 0 lines connected to the audio switch matrix 72. The DTMF decoder 192 decodes TOUCH TONE® signals, which then are interpreted by the controller 90 over bus 92. The decoded signals may also be coupled to a serial bus controller (not shown) connected to the controller 90. The AUDIO 1 lines from the audio switch matrix are connected to a single-ended IN, differential OUT amplifier 196. The differential output of amplifier 196 is coupled Via TX lines 197 to the transmit TX input of the hybrid 184.

The Analog Terminal Adapter Card 180 provides another type of connection into the subscriber loop tester 50. Analog devices, such as a POTS phone, fax machine, modem, and the like, can send and receive data over a digital ISDN line by using the card 180. The device is connected to the auxiliary input jack 54 and analog data from the device is coupled through the Analog Terminal Adapter card 180 to the audio switching matrix 72. The analog switching matrix routes the data to the ISDN lines where it is converted to a digital signal and sent out loop jack 52. The Terminal Adapter Card 180 may also be used with analog data terminals for down loading data over ISDN lines. Digital data entering the subscriber loop tester on loop jack 52 is routed through an ISDN option card 62, HIGH SPEED BUS 78, digital bus translator 80, the IDL BUS 82, the NT/ST controller 84, switch 86, D-Phone controller 88, ISDN AUDIO lines, audio switching matrix 78, AUDIO 1 lines, Analog Terminal Adapter Card 180, the Auxiliary input jack 54 to the terminal. To provide this capability in the subscriber loop tester 50, there is a need to route audio signals to the option cards 62.

Referring to FIG. 8, there is shown a simplified schematic diagram of the audio switching matrix 72 that routes audio signals to various parts of the subscriber loop tester 50. The audio switch matrix 72 provides two independent audio paths for audio signals in the subscriber loop tester 50 over two generic audio paths: one path for incoming data 200 and one for outgoing data 202. There are multiple source and destination paths for both the incoming and outgoing signal paths. The sources and destinations for both audio paths 200 and 202 are connected to a dual switch multiplexer (MUX) 230 that receives control signals from controller 90. The controller 90 configures the switches in the MUX 230 to route the audio signals to the proper source or destination depending on the test or configuration set-up for the subscriber loop tester 50. It is important in maintaining a flexible architecture for the subscriber loop tester 50 that alternate source and destination audio paths be provided where the audio can be routed back to the option cards 62.

The sources for the incoming audio path 200 are the ISDN 204, POTS MON 206, POTS TALK 208, and AUDIO 0 IN 210 coming from the option cards 62. AUDIO 0 IN is usable by the P-PHONE option card 150 or any of the other option cards 62. Destinations for the incoming audio are the speaker 212 and AUDIO 0 OUT 214, which goes to back to the option cards 62, such as the Analog Terminal Adapter option card 180. Sources for the outgoing audio 202 are the microphone 220 and the AUDIO 1 IN 222 from the option cards 62. Destinations for the outgoing audio are ISDN 224, POTS TALK 226, and AUDIO 1 OUT 228 to the option cards, such as the P-Phone option card 150.

ISDN audio may be routed through the subscriber loop tester 50 from the loop jack 52, through the option cards 62, the HIGH SPEED BUS 78, the digital bus translator 80, the NT/ST controller 84, the switch 86, the D-Phone controller 88 to the audio switching matrix 72. Alternately, the ISDN audio may be input through the TE interface jack 58 to the D-Phone controller 88. The incoming ISDN audio enters on ISDN 204 and is coupled through the MUX switch 230 to the speaker 74. Outgoing ISDN audio is generated by the microphone 76 and is coupled through the MUX switch 230 to ISDN 224, which is coupled to the D-Phone controller 88. The D-Phone controller 88 converts the analog signal to a digital signal. The digital signal may be routed through the tester 50 to loop jack 52 or it may take the alternate path to the TE interface jack 58.

POTS TALK and POTS MON audio enters on loop jack 52. The POTS MON audio is directly coupled to the audio switching matrix 72 through the POTS MON switch 96 and buffer 104. The POTS TALK audio goes to the POTS service network 100 and then to the audio switching matrix 72. The POTS TALK and POTS MON are coupled through MUX switch 230 to the speaker 74. The outgoing POTS TALK comes from the microphone 76 and is coupled through the MUX switch 230 to pots service network 100 and out the loop jack 52.

Incoming P-Phone audio is coupled from the loop jack 52, through the P-Phone option card 150 to the audio switching matrix via AUDIO 0 IN lines. The data enters the matrix 72 on AUDIO 0 IN 210 and is coupled through the MUX switch to the speaker 74. Outgoing P-Phone audio is generated by the microphone 76 and is coupled through the MUX switch 230 to the AUDIO 1 OUT 228. The AUDIO 1 OUT is connected to the P-Phone option card 150 over the AUDIO 1 OUT lines and from the option card 150 to the loop jack 52. All of the incoming audio sources may be connected to two audio destinations and all of the outgoing audio destinations may be connected to two audio sources.

Referring back to FIG. 3, the ISDN and P-Phone option cards 62 are connected to the digital bus translator 80 via the HIGH SPEED BUS 78. The digital bus translator 80 configures the HIGH SPEED BUS 78 to the transceiver circuits in the option cards. In the preferred embodiment the digital bus translator 80 is a field programmable gate array manufactured and sold by Xilinx, Inc., San Jose, Calif., under Part Number XC3030. Each transceiver circuit on an option card 62 using the HIGH SPEED BUS 78 has a corresponding program pre-stored in ROM and accessed by the controller 90. The controller 90, operating under the pre-stored programs, programs various controlling state machines in the digital bus translator 80 for each of the transceiver circuits. If the digital bus translator 80 is communicating with an AT&T AMI option card 62, the digital bus translator 80 configures the HIGH SPEED BUS 78 as a K-BUS. When configured as the K-BUS, the controller 90 has an interface to the digital bus translator 80 for handling AMI embedded operation channel messages. The digital bus translator 80 configures the HIGH SPEED BUS 78 as a IDL BUS when communicating with the Motorola 2B1Q option card 62. Since the clock rate, the organization of data, and the amount of data is different for the formatted output data from the various transceiver circuits, the digital bus translator 80 receives the formatted output data from the transceiver circuit option cards 62 and converts the data to a common data format. In the preferred embodiment, the Motorola IDL BUS standard is used. When communicating with the P-Phone option card 62, the digital bus translator 80 configures the HIGH SPEED BUS 78 for two line communications between them. The signalling data of P-Phone, which is not an ISDN protocol is coupled through the digital bus translator 80 to the controller 90. The IDL formatted data is coupled to the NT/ST controller 84, which in the preferred embodiment is manufactured and sold by Motorola, Inc. under part No. MC145475. Control for the NT/ST controller comes from the controller 90 via a SCP bus and controller (not shown). As previously mentioned, Motorola parts requiring processor control require translation through an SCP controller. The output of the NT/ST controller 84 is coupled through a termination 150 and isolation transformer 152 to the NT interface jack 56 and TE +NT switch 86. The other side of the TE +NT switch 86 is connected to the TE interface jack 58 and to the D-Phone controller 88 via isolation transformer 156 and TE termination 158. In the preferred embodiment, the D-Phone controller 88 is manufactured and sold by Advance Micro Devices under part No. AMD79C30A. The D-Phone controller 88 receives and sends ISDN AUDIO back and forth to the audio switch matrix 72. The TE+NT switch 86 is activated by a TE +NT EN from the controller 90.

In an alternative embodiment of the subscriber loop tester 50 the partitioned "U" interface is removed. Individual line transformers 110, specifically matched for each particular "U" interface line code and protocol for the ISDN standard, are placed on the option cards 62.

The LOOP AC/DC line 64 may be coupled directly to the option cards 62 eliminating the need for front end switch 60. In addition, digital telecommunications standards outside of the narrow band of the ISDN standard may be added to t he subscriber loop tester 50.

A subscriber loop tester 50 has been described having a partitioned "U" interface and a configurable internal bus structure for testing different telecommunications standards. A single loop jack provides the input for the various standards. ISDN signals are coupled through a partitioned "U" interface having a digital line transformer meeting the bandwidth and line matching requirements for the "U" interface line codes and protocols for ISDN standards. The transformer is coupled to a plurality of option cards with each card having circuitry specific to a particular line code and protocol. The option cards are connected to a high speed bus. The high speed bus is configurable by a digital bus translator to a particular bus architecture related to a transceiver circuit on the option cards. The digital bus translator further converts formatted output data from the various transceiver circuits to a common data format. An audio switching matrix is connected to the option cards and audio transducers for providing multiple paths for source and destination audio. These and other aspects of the present invention are set forth in the appended claims.

We claim:

1. A subscriber loop tester for transmitting outgoing telecommunications signals to and receiving incoming telecommunications signals from telephone switching systems implementing different data line codes and protocols and telecommunications standards comprising:

a partitioned "U" interface having a high impedance transformer coupled to receive the telecommunications signals and meeting the bandwidth and line matching requirements for different line codes and protocols implemented in an ISDN telecommunications system;

a plurality of circuits selectively coupled to receive the telecommunications signals from the high impedance transformer with each circuit having AC and DC terminations matching a specific line code and protocol and programmable attenuators for producing a proper nominal signal level as a function of the specific line code and protocol and providing variable insertion loss, the terminations and attenuators being coupled to a transceiver circuit for generating an output having a specific data format;

a digital bus translator for converting the specific data formats of the various transceiver circuits on the plurality of circuits to a common data format;

a high speed bus for coupling the output of the transceiver circuits on the plurality of circuits to the digital bus controller, the high speed bus being selectively coupled to each of the plurality of circuits and selectively configured by the digital bus translator for the specific data format of the transceiver circuit; and means for controlling source and destination audio paths for voice telecommunications signals within the subscriber loop tester 2. The subscriber loop tester as recited in claim 1 wherein the plurality of circuits further comprise non-ISDN data communications standard circuits.

3. The subscriber loop tester as recited in claim 2 further comprising a means for switching the telecommunications signals to the non-ISDN data communications standard circuits, the switching means interposed between the telephone switching network and the partitioned "U" interface.

4. The subscriber loop tester as recited in claim 2 wherein each of the plurality of circuits reside on a removable circuit board, the circuit boards being connected to a common controller bus.

5. The subscriber loop tester as recited in claim 1 wherein the digital bus translator is a field programmable gate array.

6. The subscriber loop tester as recited in claim 1 wherein the audio path controlling means is an audio switching matrix for coupling incoming and outgoing voice telecommunications signals to and from the plurality of circuits and to and from analog voice transducers.

7. The subscriber loop tester as recited in claim 1 wherein the high speed bus is a four wire bus for coupling transmit, receive, clock, and framing data.

8. A partitioned "U" interface for a subscriber loop tester comprising:
   a high impedance transformer meeting the bandwidth and line matching requirements for different line codes and protocols implemented in an ISDN telecommunications system; and
   a plurality of circuits selectively coupled to receive the telecommunications signals from the high impedance transformer with each circuit having AC and DC terminations matching a specific line code and protocol and programmable attenuators for producing a proper nominal signal level as a function of the specific line code and protocol and providing variable insertion loss.

9. The partitioned "U" interface as recited in claim 8 wherein each of the plurality of circuits reside on a removable circuit board, the circuit boards being connected to a common controller bus.

10. An internal bus architecture for a subscriber loop tester comprising:
    a plurality of circuits selectively coupled to receive telecommunications signals from an external source with each circuit having AC and DC terminations matching a specific line code and protocol and programmable attenuators for producing a proper nominal signal level as a function of the specific line code and protocol and providing variable insertion loss, the terminations and attenuators being coupled to a transceiver circuit for generating an output having a specific data format;
    a digital bus translator for converting the specific data formats of the various transceiver circuits on the plurality of circuits to a common data format;
    a high speed bus for coupling the output of the transceiver circuits on the plurality of circuits to the digital bus controller, the high speed bus being selectively coupled to each of the plurality of circuits and selectively configured by the digital bus translator for the specific data format of the transceiver circuit.

11. The internal bus architecture for a subscriber loop tester as recited in claim 10 wherein the digital bus translator is a field programmable gate array.

12. The internal bus architecture for a subscriber loop tester as recited in claim 10 wherein the high speed bus is a four wire bus for coupling transmit, receive, clock, and frame data.

13. A subscriber loop tester for transmitting outgoing telecommunications signals to and receiving incoming telecommunications signals from telephone switching systems implementing different data line codes and protocols and telecommunications standards comprising:
    a plurality of circuits selectively coupled to receive the telecommunications signals with each circuit having AC and DC terminations matching a specific line code and protocol of a telecommunications standard and programmable attenuators for producing a proper nominal signal level as a function of the specific line code and protocol and providing variable insertion loss, the terminations and attenuators being coupled to a transceiver circuit for generating an output having a specific data format;
    a digital bus translator for converting the specific data formats of the various transceiver circuits on the plurality of circuits to a common data format;
    a high speed bus for coupling the output of the transceiver circuits on the plurality of circuits to the digital bus controller, the high speed bus being selectively coupled to each of the plurality of circuits and selectively configured by the digital bus translator for the specific data format of the transceiver circuit; and
    means for controlling source and destination audio paths for voice telecommunications signals within the subscriber loop tester.

14. The subscriber loop tester as recited in claim 13 wherein selected circuits of the plurality of circuits have a high impedance transformer meeting the bandwidth and line matching requirements for different line codes and protocols implementing ISDN telecommunications standards.

15. The subscriber loop tester as recited in claim 13 wherein each of the plurality of circuits reside on a removable circuit board, the circuit boards being connected to a common controller bus.

16. The subscriber loop tester as recited in claim 13 wherein the digital bus translator is a field programmable gate array.

17. The subscriber loop tester as recited in claim 13 wherein the audio path controlling means is an audio switching matrix for coupling incoming and outgoing voice telecommunications signals to and from the plurality of circuits and to and from analog voice transducers.

18. The subscriber loop tester as recited in claim 13 wherein the high speed bus is a four wire bus for coupling transmit, receive, clock, and frame data.

* * * * *